2,990,400

4,17α-DIMETHYL-9α-FLUORO-11-OXYGENATED TESTOSTERONES

John C. Babcock, Portage Township, Kalamazoo County, and Raymond L. Pederson, Kalamazoo, Mich., assignors to The Upjohn Company, Kalamazoo, Mich., a corporation of Michigan
No Drawing. Filed June 2, 1958, Ser. No. 739,010
4 Claims. (Cl. 260—239.5)

The present invention relates to new compositions of matter, 4,17α-dimethyl-9α-fluoro-11β-hydroxytestosterone and 4,17α-dimethyl-9α-fluoro-11-ketotestosterone, and to intermediates and methods for producing the same.

The novel 4,17α-dimethyl-9α-fluoro-11β-hydroxytestosterone and 4,17α-dimethyl-9α-fluoro-11-ketotestosterone of this invention are useful as anabolic and androgenic, gonadotropin inhibiting, anti-estrogenic, and anti-fungal agents. The compounds of the present invention are particularly useful as anabolic agents and possess especial advantage, owing to their favorable anabolic-androgenic ratio, where clinical efficacy requires low relative androgenic activity.

For example, 4,17α-dimethyl-9α-fluoro-11β-hydroxytestosterone was assayed orally for anabolic and androgenic potency by the modified method of Hershberger, Meyer, and Shipley. The results, compared with those for the parent compound, 17α-methyl-9α-fluoro-11β-hydroxytestosterone Halotestin) and for 17α-methyltestosterone, are tabulated below.

POTENCY

| Compound | Anabolic | Androgenic | Ratio |
| --- | --- | --- | --- |
| 17α-methyltestosterone | 1.0 | 1.0 | 1:1 |
| 4,17α-dimethyl-9α-fluoro-11β-hydroxytestosterone | 5.4 | 1.6 | 3.4:1 |
| 17α-methyl-9α-fluoro-11β-hydroxytestosterone (Halotestin) | 20.0 | 9.5 | 2.1:1 |

It can be readily seen from the above table that the anabolic-androgenic ratio of 4,17α-dimethyl-9α-fluoro-11β-hydroxytestosterone is considerably greater than that for the parent, 17α-methyl-9α-fluoro-11β-hydroxytestosterone. Thus when androgenic side effects are the limiting factor, a greater anabolic response can be obtained from 4,17α-dimethyl-9α-fluoro-11β-hydroxytestosterone than from 17α-methyl-9α-fluoro-11β-hydroxytestosterone at equivalent androgenic doses. This is particularly significant in pediatric and geriatric practice where appreciable androgenic effects are clearly contraindicated.

The compounds of the present invention by virtue of their anabolic properties are useful in promoting retention of nitrogen (protein), increasing weight, restoring muscle strength, and increasing the sense of well-being in debilitated patients. Their ability to increase erythropoiesis, as well, make theim particularly useful in anemic conditions. The compounds of this invention, because of their favorable anabolic-androgenic ratio and high potency at suitable low doses, can effect these responses while producing no, or only a minimal androgenic response. The ability of these compounds to cause gain in weight gives to them the additional utility of being valuable additives to animal and poultry feeds.

The novel compounds of the present invention have decided advantage over many of the selective anabolic-androgenic compounds known in the prior art in that they are active when administered orally.

The novel products of the present invention can be prepared as follows: 17α-methyl-9α-fluoro-11β-hydroxytestosterone is reacted with a secondary cyclic amine to produce a 3-enamine of 17α-methyl-9α-fluoro-11β-hydroxytestosterone. The enamine produced is then reacted with a methylating agent in a dry organic solvent to produce the 3-enamine of 4,17α-dimethyl-9α-fluoro-11β-hydroxytestosterone. Hydrolysis of the latter compound produces 4,17α-dimethyl-9α-fluoro-11β-hydroxytestosterone. The 4,17α-dimethyl-9α-fluoro-11β-hydroxytestosterone thus produced can be oxidized by use of a suitable oxidizing agent to produce the corresponding 4,17α-dimethyl-9α-fluoro-11-ketotestosterone.

These reactions and the compounds thus produced can be illustrated schematically as follows:

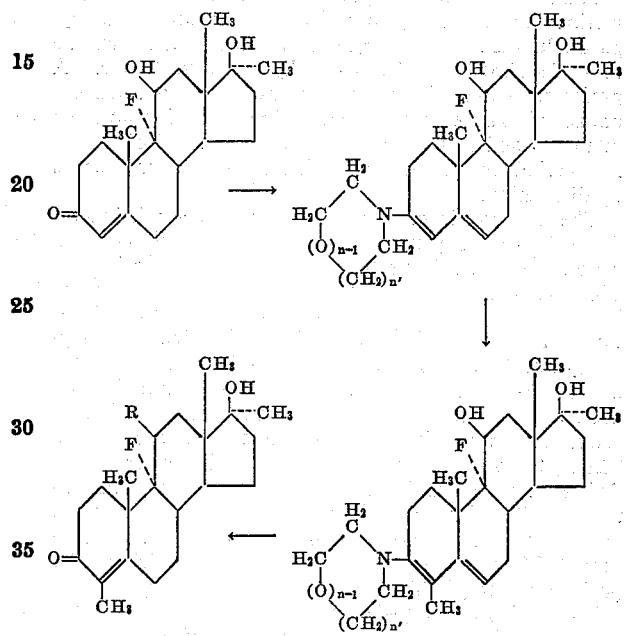

wherein R is selected from the group consisting of β-hydroxy and keto, and wherein n and n' are whole numbers from one to two, inclusive.

According to the process of the present invention, the ketone group at the 3-position of the 17α-methyl-9α-fluoro-11β-hydroxytestosterone is converted to the 3-enamine derivative by reaction with a secondary cyclic amine. Amines which can be used in step I are pyrrolidine, morpholine, homomorpholine, piperidine, C-alkyl substituted pyrrolidines, e.g., 2,4-dimethylpyrrolidine, 3-isopropylpyrrolidine, 3,3-dimethylpyrrolidine, and the like. Of these amines, pyrrolidine is preferred. The selected amine is usually used in a molar excess, calculated on the starting steroid, to achieve the optimum yield of enamine product. Although large molar equivalency excesses of an amine can be employed in the reaction, the preferred proportion of amine to starting steroid is usually from about 1.1 to about seven moles of amine per mole of steroid and especially from about 1.1 to two.

For substantially complete and rapid reaction with some of the above-mentioned amines, use of a catalyst is advantageous. Acid catalysts such as para-toluenesulfonic acid, benzenesulfonic acid, sulfoacetic acid, anhydrous hydrogen chloride, concentrated sulfuric acid, other organic and inorganic acids, and the like can be used; a sulfonic acid, e.g., para-toluenesulfonic acid being preferred. When pyrrolidine is used, excellent results are obtained without the use of a catalyst.

Moisture in the reaction mixture is detrimental to the procurement of high yields of product, and preferred reaction conditions therefore include removal of the water formed during the enamine formation by known methods. The reaction is preferably conducted above room temperature, i.e., above about 25 degrees centigrade, e.g., between about 25 and 100 degrees centigrade. Reaction times may vary between about a few minutes to several days, depending in part upon the reaction solvent or solvents, ratio of reactants, selected amine, water removal, and temperature. Reaction solvents employed are inert organic solvents such as, benzene, toluene, xylene, chlorobenzene, pentane, hexane, chloroform, methylene chloride, carbon tetrachloride, methanol, ethanol, tertiary butyl alcohol, tetrahydrofuran, dioxane, and the like.

The 3-enamine of 17α-methyl-9α-fluoro-11β-hydroxytestosterone thus produced is then methylated in a dry inert organic solvent such as ethanol, methanol, isopropanol, tertiary butanol, pentane, hexane, chlorinated hydrocarbon, dimethylformamide, dioxane, and the like with an excess of methylating agent such as methyl iodide, methyl chloride, methyl bromide, dimethylsulfate, methyl para-toluenesulfonate, and the like to form the 3-enamine of 4,17α-dimethyl-9α-fluoro-11β-hydroxytestosterone. A preferred method is to treat the isolated and dried enamine with an excess of methyl iodide in dry absolute methanol and reflux for 48 hours. At the end of the reflux period, the excess methyl iodide can be removed as by distillation.

The thus-produced 3-enamine of 4,17α-dimethyl-9α-fluoro-11β-hydroxytestosterone is then hydrolyzed with water, aqueous acid or base, or alkanol-water mixtures. This treatment removes the 3-enamine group and results in regeneration of the Δ⁴-3-keto group in the steroid nucleus, thus producing 4,17α-dimethyl-9α-fluoro-11β-hydroxytestosterone. A preferred method for the hydrolysis of the 3-enamine of 4,17α-dimethyl-9α-fluoro-11β-hydroxytestosterone is an aqueous methanol solution at room temperature for a peroid of about ten to 65 hours. The hydrolysis mixture is then diluted with water (acidified, if a base has been used for hydrolysis) and extracted with ether, methylene chloride, benzene, toluene, or the like. Evaporation of the solvent produces 4,17α-dimethyl-9α-fluoro-11β-hydroxytestosterone which can be purified by recrystallization or by chromatography.

The 4,17α-dimethyl-9α-fluoro-11β-hydroxytestosterone can be oxidized to produce the corresponding 4,17α-dimethyl-9α-fluoro-11-ketotestosterone. Generally speaking, the oxidation can be carried out by a variety of methods, such as, for example, by oxidizing the said 4,17α-dimethyl-9α-fluoro-11β-hydroxytestosterone in acid solution, such as acetic acid solution, with chromium trioxide, sodium dichromate, potassium dichromate, and the like, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the oxidation reaction, the oxidant is generally destroyed by addition of methyl alcohol, ethyl alcohol, and the like for the chromic acid oxidant, or a bisulfite for N-bromoacetamide, N-bromosuccinimide and other N-halo acyl amides and imides. Thereafter the resulting 4,17α-dimethyl-9α-fluoro-11-ketotestosterone is recovered by conventional means such as by crystallization, extraction with water immiscible solvents, e.g., methylene chloride, ether, benzene, toluene, hexane, and the like. The solvent is then removed by distillation and the resulting product purified by recrystallization, chromatography, or the like, yielding 4,17α-dimethyl-9α-fluoro-11-ketotestosterone.

The 4,17α-dimethyl-9α-fluoro-11β-hydroxytestosterone and 4,17α-dimethyl-9α-fluoro-11-ketotestosterone of this invention can be prepared and administered in a wide variety of oral dosage forms singly, or in admixture with other coacting compounds. They can be associated with a carrier which can be a solid material or a liquid in which the compound is dissolved, dispersed or suspended. The solid compositions can take the form of tablets, powders, capsules, pills or the like, preferably in unit dosage forms for simple administration of precise dosages. The liquid compositions can be in the form of solutions, emulsions, suspensions, syrups, or elixirs. The products of this invention can also be added to animal feeds according to procedures well known in the art.

The following examples are illustrative of the production of the compound of the present invention, but are not to be construed as limiting.

EXAMPLE 1

*3-pyrrolidyl enamine of 17α-methyl-9α-fluoro-11β-hydroxytestosterone*

A solution of 1.8 grams of 17α-methyl-9α-fluoro-11β-hydroxytestosterone, in ten milliliters of methylene chloride and ten milliliters of absolute methanol was concentrated by distillation to about thirteen milliliters. The solution was cooled slightly and 1.8 milliliters of pyrrolidine was added. When the reaction was complete (after about three minutes) the mixture was chilled and the crystalline enamine was isolated by filtration giving the 3-pyrrolidyl enamine of 17α-methyl-9α-fluoro-11β-hydroxytestosterone melting at 175 to 178 degrees centigrade, and having an ultraviolet absorption of $\lambda_{max}^{methanol}$ 274 mμ, ($a_M$ 22,200)

EXAMPLE 2

*4,17α-dimethyl-9α-fluoro-11-β-hydroxytestosterone*

A solution containing 1.8 grams of the 3-pyrrolidyl enamine of 17α-methyl-9α-fluoro-11β-hydroxytestosterone, ten milliliters of methylene chloride, and ten milliliters of absolute methanol (dried over magnesium) and ten milliliters of methyl iodide was refluxed for 48 hours. The excess methyl iodide was removed by distillation leaving the crude 3-pyrrolidyl enamine of 4,17α-dimethyl-9α-fluoro-11β-hydroxytestosterone.

Ten milliliters of fifty percent aqueous methanol was added to the crude 3-pyrrolidyl enamine above, and the mixture was allowed to stand for 65 hours at 25 degrees centigrade. The hydrolysis mixture was then diluted with water to perceptible cloudiness and extracted with six 50-milliliter portions of ether. The combined extracts were washed with acid (2.5 N-hydrochloric), alkali (five percent sodium hydroxide), water, and then dried over sodium sulfate. Removal of the solvent left 0.50 gram of neutral material which was dissolved in fifteen milliliters of methylene chloride and chromatographed over 25 grams of Florisil synthetic magnesium silicate. Elution with 35-milliliter fractions of ten percent acetone in Skellysolve B hexanes gave, in fractions 17 through 26, 214 milligrams of desired product. Recrystallization from methylene chloride-Skellysolve B gave 163 milligrams of 4,17α-dimethyl-9α-fluoro-11β-hydroxytestosterone melting at 203 to 206 degrees centigrade, and having an ultraviolet absorption of $\lambda_{max}^{alc.}$ 250 mμ, ($a_M$ 15,300)

*Analysis.*—Calculated for $C_{21}H_{31}FO_3$: C, 71.97; H, 8.92; F, 5.42. Found: C, 71.74; H, 9.02; F, 5.39.

EXAMPLE 3

*4,17α-dimethyl-9α-fluoro-11-ketotestosterone*

To a solution of 500 milligrams of 4,17α-dimethyl-9α-fluoro-11β-hydroxytestosterone dissolved in three milliliters of glacial acetic acid was added a solution of 500 milligrams of sodium dichromate dihydrate dissolved in three milliliters of glacial acetic acid. The resulting mixture was allowed to stand for six hours at room temperature. Thereafter, the excess oxidant was destroyed by adding one milliliter of methanol and allowing the mixture to stand for one-half hour at about 25 degrees centigrade. The reaction mixture was then diluted slowly with water until crystallization began. The mixture was chilled and the resulting crystalline 4,17α-dimethyl-9α-fluoro-11-ketotestosterone was collected on a filter. Recrystallization from aqueous methanol afforded the pure 4,17α-dimethyl-9α-fluoro-11-ketotestosterone, a light colored crystalline solid.

It is to be understood that the invention is not to be limited to the exact details shown and described, as obvious modifications and equivalents will be apparent to one skilled in the art, and the invention is therefore to be limited only by the scope of the appended claims.

We claim:

1. 4,17α-dimethyl-9α-fluoro-11-oxygenated testosterones of the following formula:

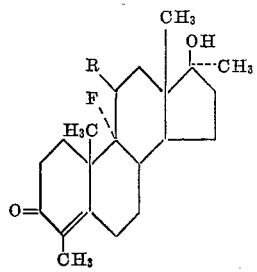

wherein R is selected from the group consisting of β-hydroxy and keto.
2. 4,17α-dimethyl-9α-fluoro-11β-hydroxytestosterone.
3. 4,17α-dimethyl-9α-fluoro-11-ketotestosterone.
4. 3-pyrrolidyl enamine of 4,17α-dimethyl-9α-fluoro-11β-hydroxytestosterone.

References Cited in the file of this patent

UNITED STATES PATENTS

| 2,793,218 | Herr | May 21, 1957 |
| 2,844,602 | Ringold et al. | July 22, 1958 |

OTHER REFERENCES

Rodd: Chemistry of Carbon Compounds, volume II, part B, alicyclic compounds, 1953, page 935.
Johnson et al.: J. Am. Chem. Soc., 78, 430–436 (1956).
Atwarter: J. Am. Chem. Soc., 79, 5315–5316 (1957).